(12) United States Patent
Wong et al.

(10) Patent No.: US 9,591,193 B2
(45) Date of Patent: Mar. 7, 2017

(54) COOLING OF INTEGRATED LED LIGHTS AND MICRO CAMERA FOR MINIMALLY INVASIVE SURGERIES

(71) Applicant: NATIONAL TSING HUA UNIVERSITY, Hsinchu (TW)

(72) Inventors: Shwin-Chung Wong, Hsinchu (TW); Suh-Yun Feng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 200 days.

(21) Appl. No.: 14/696,352

(22) Filed: Apr. 24, 2015

(65) Prior Publication Data

US 2015/0316245 A1 Nov. 5, 2015

(30) Foreign Application Priority Data

May 1, 2014 (TW) .............................. 103115681 A

(51) Int. Cl.
| | |
|---|---|
| *H04N 5/00* | (2011.01) |
| *H04N 5/225* | (2006.01) |
| *F21V 29/56* | (2015.01) |
| *F21V 33/00* | (2006.01) |
| *F21W 131/20* | (2006.01) |
| *F21Y 101/00* | (2016.01) |

(52) U.S. Cl.
CPC .......... *H04N 5/2256* (2013.01); *F21V 29/56* (2015.01); *F21V 33/0068* (2013.01); *H04N 5/2251* (2013.01); *H04N 5/2257* (2013.01); *F21W 2131/20* (2013.01); *F21Y 2101/00* (2013.01); *H04N 2005/2255* (2013.01)

(58) Field of Classification Search
None
See application file for complete search history.

(56) References Cited

U.S. PATENT DOCUMENTS

| 6,513,962 B1 * | 2/2003 | Mayshack ................. F21V 3/04 362/33 |
|---|---|---|
| 7,630,148 B1 * | 12/2009 | Yang ................... A61B 1/00096 359/664 |
| 2005/0104059 A1 * | 5/2005 | Friedman ........... A61M 25/1011 257/40 |
| 2008/0009677 A1 * | 1/2008 | Shoroji .............. A61B 1/00052 600/160 |
| 2008/0239070 A1 * | 10/2008 | Westwick .............. A61B 1/045 348/68 |
| 2009/0001372 A1 * | 1/2009 | Arik ........................ C09K 5/10 257/58 |

(Continued)

FOREIGN PATENT DOCUMENTS

CN 103605204 2/2014

*Primary Examiner* — Reza Aghevli

(57) ABSTRACT

A liquid cooling method for cooling LED lights used for minimally invasive surgeries is provided. The LED lights are integrated with the micro camera so that only one pipeline is needed to accommodate the electrical wires and cooling liquid conduits. The electrical wires disposed in the electrical wire conduit provide the path for electrical power required by the micro camera and the LED lights as well as the electronic signals from the micro camera. The liquid conduits guide the circulating cooling liquid to pass by the bottom surface of the LED substrate and carry the generated heat off the human body.

9 Claims, 4 Drawing Sheets

(56) References Cited

U.S. PATENT DOCUMENTS

| | | | | |
|---|---|---|---|---|
| 2009/0315986 A1* | 12/2009 | Ohara | ............... | A61B 1/05 348/65 |
| 2010/0317922 A1* | 12/2010 | Kumai | ............... | A61B 1/00068 600/118 |
| 2011/0092772 A1* | 4/2011 | Weber | ............... | A61B 1/0008 600/178 |
| 2011/0261563 A1* | 10/2011 | Li | ............... | F21V 3/04 362/235 |
| 2011/0305056 A1* | 12/2011 | Chien | ............... | F21S 8/035 363/178 |
| 2012/0230024 A1* | 9/2012 | Moore | ............... | A61B 1/063 362/231 |

* cited by examiner

COOLING OF INTEGRATED LED LIGHTS AND MICRO CAMERA FOR MINIMALLY INVASIVE SURGERIES

CROSS REFERENCE TO RELATED APPLICATIONS

The present application is based on, and claims priority from, Taiwan Patent Application No. 103115681, filed on May 1, 2014, the disclosure of which is hereby incorporated by reference herein in its entirety.

BACKGROUND OF THE INVENTION

Field of the Invention

The application relates to a liquid cooling method of light emitting diode (LED) lights used for minimally invasive surgeries.

Description of the Related Art

Because an LED can have small dimensions and provide illumination of high-brightness, it is suitable as an illuminating tool for minimally invasive surgeries. However, heat is produced when the LED emits light. If the generated heat is not dissipated out of the human body, the LED may lose its functionality and human tissue may be damaged due to the high temperature. Patent U.S. Pat. No. 7,306,559B2 discloses a plurality of LEDs on a metal structure. The generated heat of those LEDs is transferred to the metal structure, but still cannot be exported out of the human body. Therefore, the generated heat may still accumulate to cause increased temperature. Patent U.S. Pat. No. 8,622,896B1 teaches an endoscopy having a LED light, wherein the LED light is disposed in a larger chamber at the eyepiece end. The light emitted from the LED light is guided through the optical fiber in the pipeline chamber of the endoscopy to the objective end. The cleaning fluid can flow around the LED light and bring out the generated heat. However, since the LED light source of the endoscopy in U.S. Pat. No. 8,622,896B1 cannot be put in the human body, the light emitted from the LED light needs to be guided through the optical fiber into the human body. Furthermore, the structure of this endoscopy is complex and costly. When the minimally invasive surgery is performed, the light of the LED illumination should be guided into the human body. A simple method is putting the LED light into the human body, but the generated heat should be efficiently carried out off the human body. Therefore, an integrated LED lights and micro camera is provided in this invention, and a simple and efficient cooling method is also provided. The generated heat can be carried out of the human body by the circulation liquid.

BRIEF SUMMARY OF INVENTION

A liquid cooling method for cooling LED lights used for minimally invasive surgeries is provided, wherein the LED lights may be put in the human body. The LED lights are integrated with the micro camera so that only one pipeline is needed to accommodate the electrical wires and cooling liquid conduits. Electrical wires and signal wires are disposed in the electrical wire conduit. The electrical wires connect the camera with ground and supply power. The signal wires transmit the recording single. In some embodiments, the signal wires can be omitted, and the electrical wires can be used as the signal wires simultaneously. The liquid conduits guide the circulating cooling liquid to pass by the bottom surface of the LED substrate and carry the generated heat off the human body.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
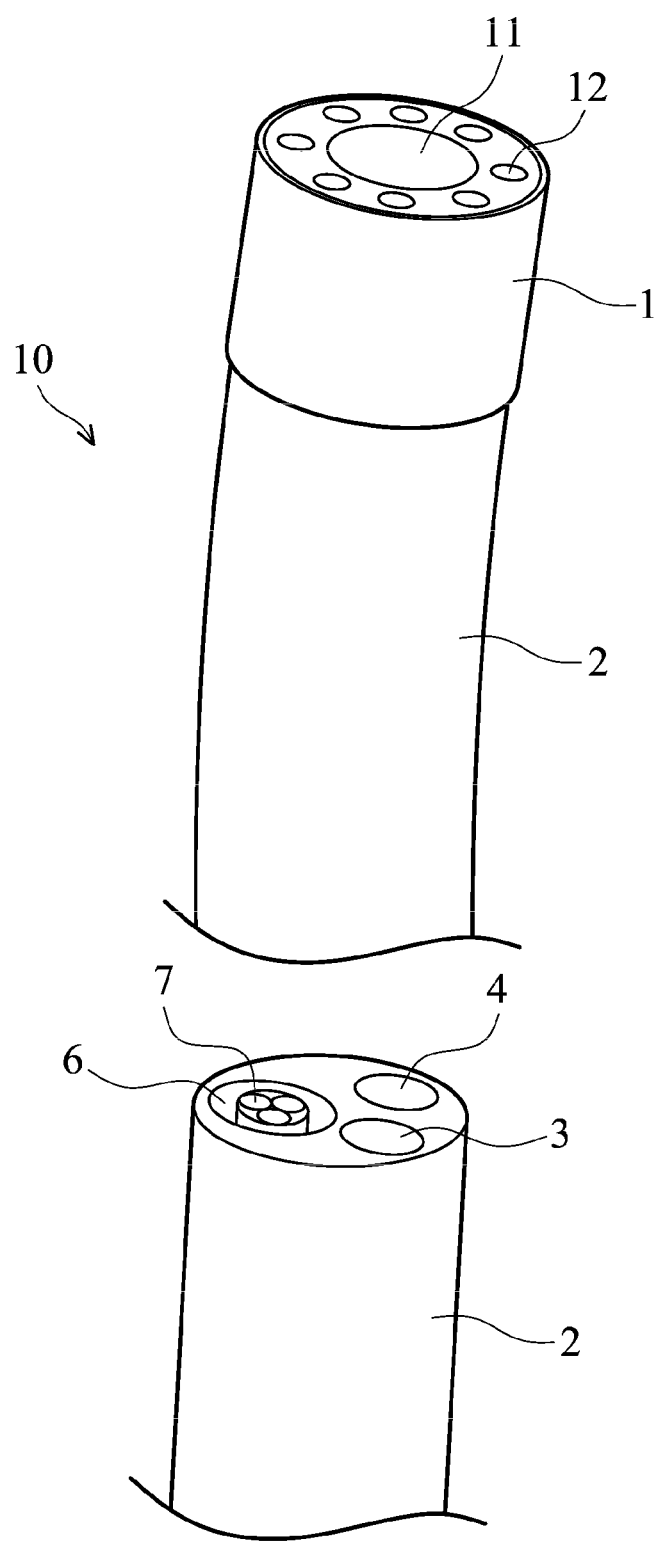
FIG. 1 is a schematic diagram of an integrated LED lights and micro camera according to an embodiment of the invention.

FIG. 1 is a schematic diagram of an integrated LED lights and micro camera 10 according to an embodiment of the invention, wherein the front end of the integrated LED lights and micro camera 10 is an integrated LED lights and micro camera unit 1. The integrated LED lights and micro camera unit 1 is connected to the pipeline 2 extending outside the human body. The pipeline 2 comprises an inlet passage 3, an outlet passage 4, and an electrical wire conduit 6, wherein circulating cooling liquid can flow in and out through the inlet and outlet passages 3 and 4, respectively. An end of the pipeline 2 outside the human body connects to a cooling liquid circulating pump, a power supply, and a recording signal processor of a main apparatus. The material of pipeline 2 can be flexible plastic, rubber, or silicone, and the circulating cooling liquid can be water or a dielectric fluid.

Figure 2:
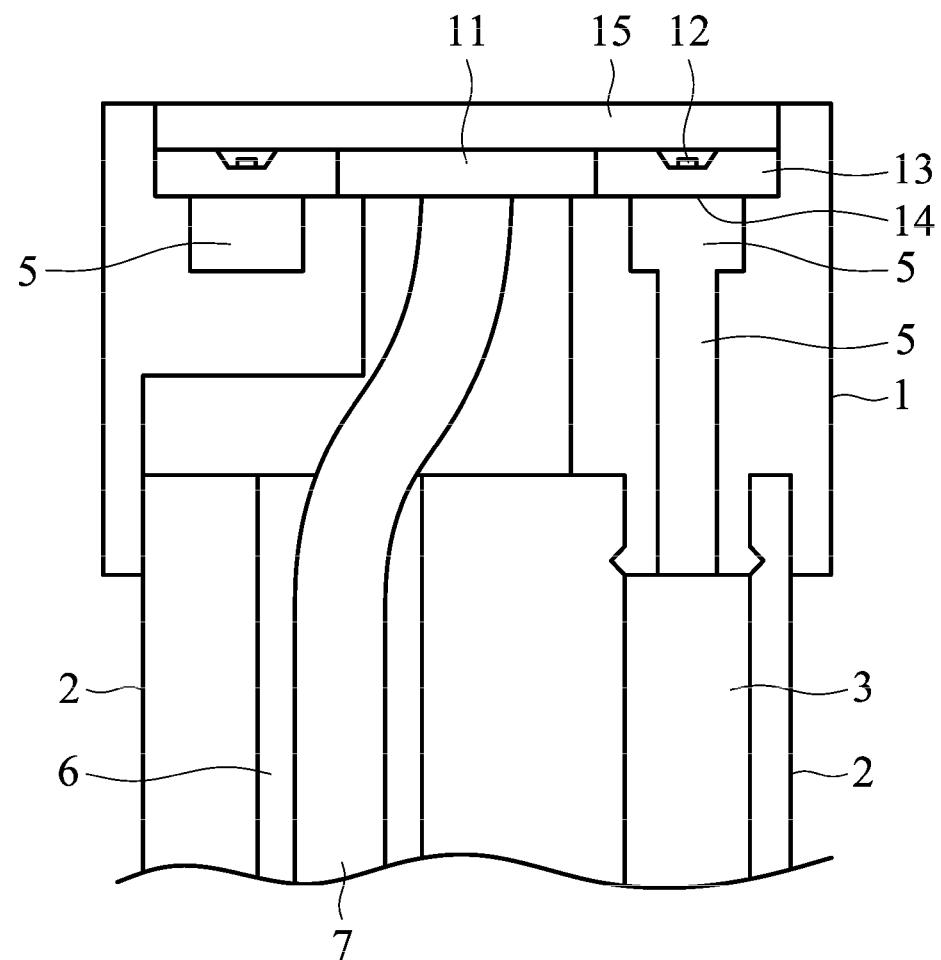
FIG. 2 is a cross-sectional view of an integrated LED lights and micro camera according to an embodiment of the invention.

FIG. 2 is a cross-sectional view of the integrated LED lights and micro camera according to an embodiment of the invention. A micro camera 11 is disposed on the central region of the integrated LED lights and micro camera unit 1, and a plurality of LED lights 12 is disposed on the LED substrate 13 surrounding the micro camera 11. A lens 15 formed by plastic or glass covers the LED lights 12 and the micro camera 11. In this embodiment, because the LED lights 12 have an annular arrangement, an internal flow channel 5 in the integrated LED lights and micro camera unit 1 has an annular structure accordingly. Therefore, the cooling liquid can be guided from the inlet passage 3 to the bottom surface 14 of the annular LED substrate 13, and flow out through the outlet passage 4 to a heat exchanger outside the human body. When the cooling liquid flows through the bottom surface 14 of the LED substrate 13, thermal contact is made between each other. The heat generated from the LED lights 12 can be guided into the cooling liquid, which can flow to the heat exchanger outside the human body through the outlet passage 4 to discharge the heat to the environment (the outlet passage 4 is not shown in the cross-sectional view, and the relative position between inlet and outlet conduits is shown in FIG. 1). The micro camera 11 and the LED lights 12 can be formed on the same substrate. In some embodiments, the micro camera 11 and the LED lights 12 can be formed on different substrates. A dielectric layer can be formed on the bottom surface 14 of the LED substrate 13 to prevent the electrical current from flowing into the cooling liquid. Electrical wires 7 in the electrical wire conduit 6 can supply power to the LED lights 12 and the micro camera 11, and the recording signals from the micro camera 11 can be transmitted to the processor outside the human body through the electrical wires 7. To avoid condensation on the lens 15, the outer surface of the lens 15 can be made to be anti-frost in a physical or chemical way.

Figure 3:
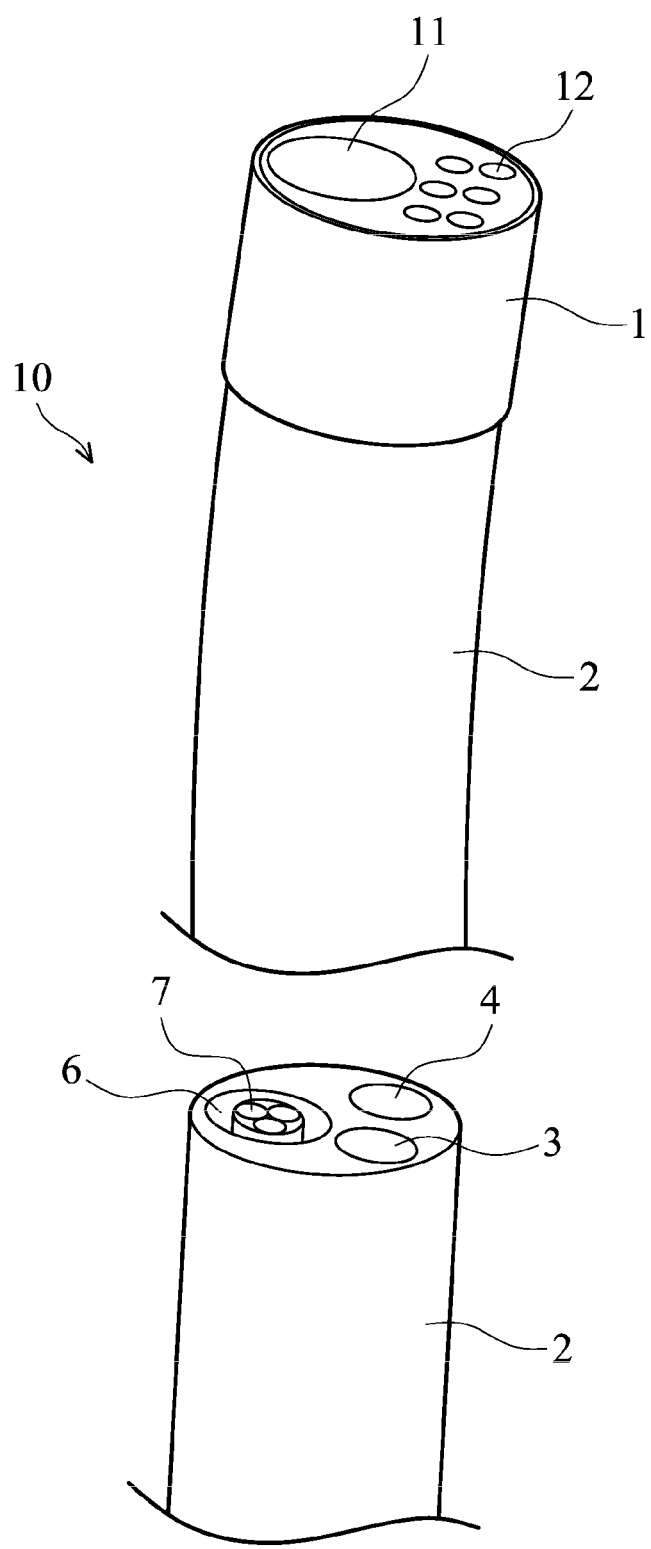
FIG. 3 is a schematic diagram of an integrated LED lights and micro camera according to another embodiment of the invention.

FIG. 3 is a schematic diagram of an integrated LED lights and micro camera according to another embodiment of the invention. A micro camera 11 is disposed on a side of an integrated LED lights and micro camera unit 1, and an electrical wire conduit 6 and electrical wires 7 therein are disposed under the micro camera 11. A plurality of LED lights 12 is disposed on another side. The bottom surface 14 of the LED substrate 13 contacts the cooling liquid, such that the generated heat can be discharged through an outlet passage 4 by the cooling liquid. In this embodiment, because the plurality of LED lights 12 are disposed on one side of the integrated LED lights and micro camera unit 1, an internal flow channel 5 does not need to be formed as the annular structure in FIG. 2. The internal flow channel 5 guides the cooling liquid through the inlet passage 3 to the bottom surface 14 of the LED substrate 13, and guides it to flow out through the outlet passage 4.

Figure 4:
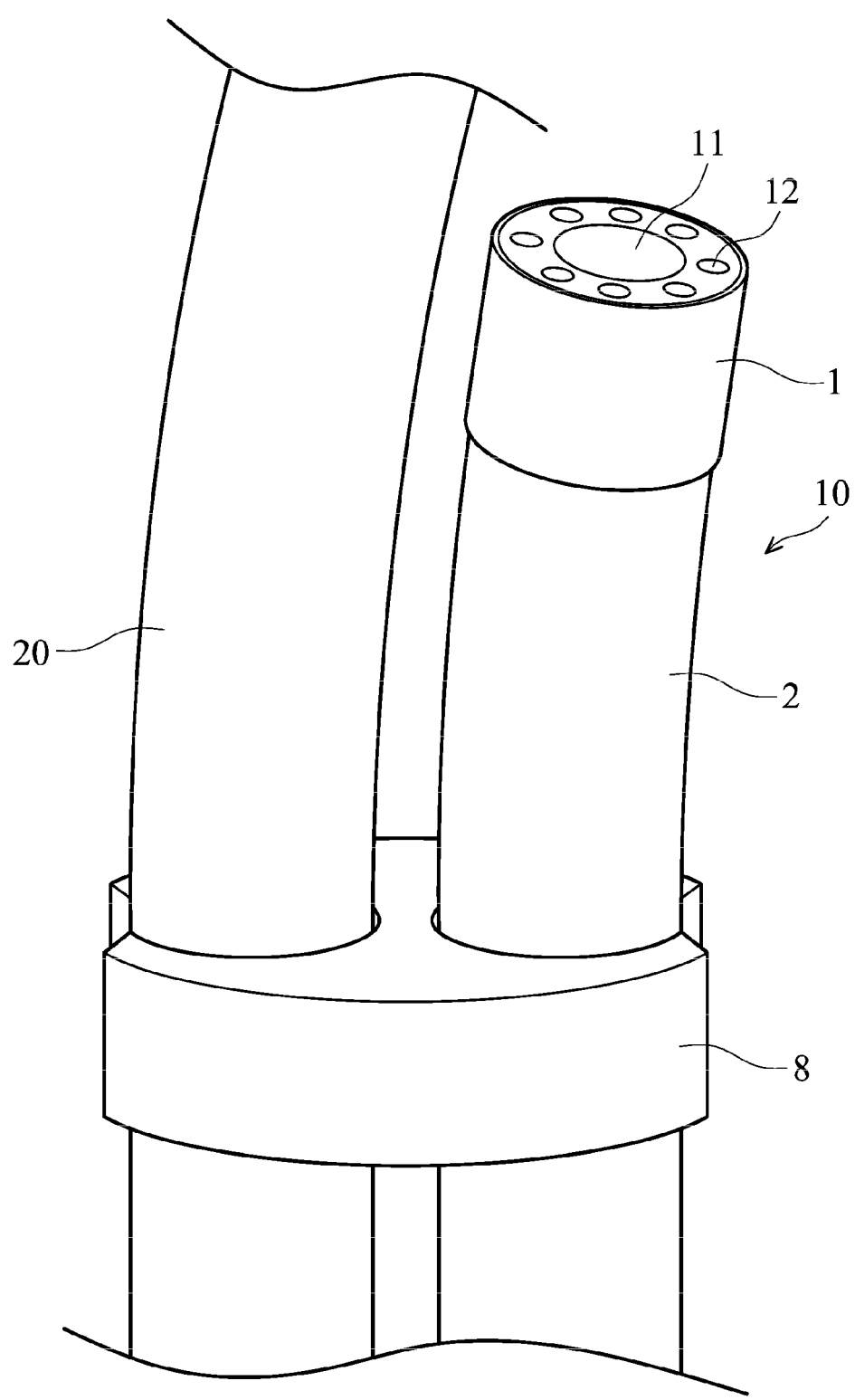
FIG. 4 is a schematic diagram of an integrated LED lights and micro camera attached on a pipe wall of a minimally invasive surgery apparatus according to an embodiment of the invention.

FIG. 4 shows that the pipeline 2 can be attached on a pipe wall of a minimally invasive surgery apparatus by a plurality of connectors 8.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An integrated LED lights and micro camera for minimally invasive surgeries, comprising:
    an integrated LED lights and micro camera unit, comprising a micro camera and a plurality of LED lights connecting to a LED substrate;
    a lens, covering the micro camera and the LED lights; and
    a pipeline, connecting between the integrated LED lights and micro camera unit and an apparatus outside a human body, the pipeline comprising:
        an inlet passage;
        an outlet passage; and
        an electrical wire conduit, wherein electrical wires are accommodated to connect the micro camera and the LED lights with a power supply and a signal processor outside the human body for providing power to the micro camera and the LED lights and transmitting signals from the micro camera to the signal processor;
    wherein when a circulating cooling liquid is cooled by a heat exchanger outside the human body and guided to a bottom surface of the LED substrate, thermal contact is made between each other and the heat generated from the LED lights is transferred to the circulating cooling liquid, and when the circulating cooling liquid flows out of the human body through the outlet passage to the heat exchanger, the generated heat is discharged to an environment.

2. The integrated LED lights and micro camera as claimed in claim 1, wherein the micro camera is disposed on the central region of the integrated LED lights and micro camera unit, and the LED lights surrounds the micro camera.

3. The integrated LED lights and micro camera as claimed in claim 1, wherein the micro camera is disposed on a side of the integrated LED lights and micro camera unit, and the LED lights are disposed on another side of the integrated LED lights and micro camera unit.

4. The integrated LED lights and micro camera as claimed in claim 1, wherein a dielectric layer is formed on the bottom surface of the LED substrate.

5. The integrated LED lights and micro camera as claimed in claim 1, wherein the LED lights and the micro camera are formed on the LED substrate.

6. The integrated LED lights and micro camera as claimed in claim 1, wherein the material of the pipeline belongs to the group comprising plastic, rubber, and silicone.

7. The integrated LED lights and micro camera as claimed in claim 1, wherein the circulating cooling liquid belongs to the group comprising water and dielectric fluids.

8. The integrated LED lights and micro camera as claimed in claim 1, wherein the integrated LED lights and micro camera is attached on a pipe wall of a minimally invasive surgery apparatus by a connector.

9. The integrated LED lights and micro camera as claimed in claim 1, wherein the outer surface of the lens is made to be anti-frost.

* * * * *